United States Patent
Xiao

(10) Patent No.: US 9,139,248 B2
(45) Date of Patent: Sep. 22, 2015

(54) HAND-SWING TYPE SHILLY-CAR

(71) Applicant: Kunshan Jian Xiang Wei Mechanical Technology Co., LTD., Kunshan, Jiangsu Province (CN)

(72) Inventor: Jian-Wei Xiao, Kunshan (CN)

(73) Assignee: KUNSHAN JIAN XIANG WEI MECHANICAL TECHNOLOGY CO., LTD., Kunshan, Jiangsu Province (CN)

( * ) Notice: Subject to any disclaimer, the term of this patent is extended or adjusted under 35 U.S.C. 154(b) by 0 days.

(21) Appl. No.: 14/133,828

(22) Filed: Dec. 19, 2013

(65) Prior Publication Data
US 2015/0175234 A1    Jun. 25, 2015

(51) Int. Cl.
| B62D 61/06 | (2006.01) |
| B62K 19/02 | (2006.01) |
| B62M 1/16 | (2006.01) |
| B62K 9/02 | (2006.01) |
| B62K 5/06 | (2006.01) |

(52) U.S. Cl.
CPC . *B62K 19/02* (2013.01); *B62K 9/02* (2013.01); *B62M 1/16* (2013.01); *B60G 2300/122* (2013.01); *B62K 5/06* (2013.01)

(58) Field of Classification Search
CPC ....... B62K 9/02; B62K 5/06; B60G 2300/122
USPC ........... 280/62, 253, 265, 266, 244, 263, 210, 280/218
See application file for complete search history.

(56) References Cited

U.S. PATENT DOCUMENTS

| 3,663,038 | A | * | 5/1972 | Hendricks | 280/218 |
| 4,200,304 | A | * | 4/1980 | Hwang | 280/218 |
| 4,281,844 | A | * | 8/1981 | Jackman et al. | 280/87.01 |
| D469,819 | S | * | 2/2003 | Nicolle et al. | D21/426 |
| 6,808,188 | B1 | * | 10/2004 | Fan | 280/87.041 |
| D582,992 | S | * | 12/2008 | Alais | D21/426 |
| D706,876 | S | * | 6/2014 | Grout | D21/426 |
| 2002/0113404 | A1 | * | 8/2002 | Yang | 280/293 |
| 2005/0236800 | A1 | * | 10/2005 | Lai | 280/218 |

FOREIGN PATENT DOCUMENTS

CN           202379023 U    8/2012

* cited by examiner

*Primary Examiner* — Kevin Hurley
*Assistant Examiner* — Marlon Arce
(74) *Attorney, Agent, or Firm* — Jackson IPG PLLC; Demian K. Jackson

(57) ABSTRACT

A hand-swing type shilly-car includes a main frame module and a hand-swing module. The main frame module includes a rear-wheel tube, a T-shaped structure formed by the rear-wheel tube and main-frame tube and having a cushion, two wheels installed at both ends of the rear-wheel tube respectively, and a pedal tube installed at the front of the main-frame tube. The hand-swing module includes a swing tube, a handlebar at the top of the swing tube, a guide wheel at the bottom of the swing tube, a bearing sleeve at the top of the swing tube and opposite to the guide wheel and having a bearing at the top and bottom of the bearing sleeve. A fixing element with a C-shaped structure is installed at the main-frame tube for receiving both bearing sleeve and bearings, and a fixing shaft is provided for rotably fixing the bearing sleeve and bearings.

5 Claims, 4 Drawing Sheets

HAND-SWING TYPE SHILLY-CAR

FIELD OF THE INVENTION

The present invention relates to a hand-swing type shilly-car with a lightweight and enhanced structural main body to provide a more comfortable ride and an exercise for a more healthy development and growth of children.

BACKGROUND OF THE INVENTION

In general, a conventional sitting-type hand-controlled shilly car as disclosed in P.R.C. Pat. No. 201120550670.2 and Publication No. CN202379023U published on Aug. 15, 2012 comprises a hand-controlled handlebar module, a link rod module and a seat frame, wherein the hand-controlled handlebar module includes a front wheel, and the seat frame includes a rear wheel mounted thereon, and a rear end of the link rod module is coupled to the seat frame, and a front section of the link rod module has left and right pedal rods. The conventional sitting-type hand-controlled shilly car is characterized in that a bushing shaft is extended vertically upward from the bottom of the hand-controlled handlebar module, and a bushing is installed at a front end of the link rod module, and a bearing is installed in the bushing, wherein the bushing shaft of the hand-controlled handlebar module is plugged in from a lower end of the bushing and passed through the bearing in the bushing, and a screw is inserted from an upper end of the bushing and coupled to a threaded hole at the top of the bushing shaft, so that the hand-controlled handlebar and the link rod can be movably swung to provide recreation and fun.

However the conventional sitting-type hand-controlled shilly-car still has the following drawbacks and disadvantages:

1. The whole car is made of steel tubes, and thus the car is very heavy, uneasy to be operated by a child of 3~5 years old, and unsafe.

2. Although the conventional sitting-type hand-controlled shilly-car can overcome the easy damage of a plastic shilly-car caused by collisions, yet the canvas cushion and backrest tube of the sitting-type hand-controlled shilly-car may hurt children's back and affect their growth and development.

3. The conventional sitting-type hand-controlled shilly-car is assembled by joints, and thus the assembling process takes much time and the assembly may be loosened or may fall apart during use, and thus the car is unsafe and the adjustment of the car is uneasy.

SUMMARY OF THE INVENTION

In view of the aforementioned drawbacks of the conventional shilly car, it is a primary objective of the present invention to overcome the drawbacks of the prior art by providing a shilly-car with a simple and reliable structure, a flexible operation, and a comfortable and safe ride.

To achieve the aforementioned objective, the present invention provides a hand-swing type shilly-car comprising a main frame module and a hand-swing module, wherein main frame module includes a rear-wheel tube and an end fixed to a main-frame tube at the middle of the rear-wheel tube, a T-shaped structure formed by the rear-wheel tube and the main-frame tube and installed with a cushion, and two moving wheels installed at both ends of the rear-wheel tube respectively, and a pedal tube installed on both left and right sides of a front end of the main-frame tube respectively; and the hand-swing module includes a swing tube, a handlebar installed at the top of the swing tube, a guide wheel installed at the bottom of the swing tube, a bearing sleeve disposed at the top end of the swing tube and opposite to the guide wheel, and a bearing installed separately at the top and bottom inside the bearing sleeve; wherein the fixing element with a C-shaped structure is installed at an end of the pedal tube of the main-frame tube for containing the bearing sleeve and the bearings at both ends of the bearing sleeve, and the shilly-car further comprises a fixing shaft for rotably fixing the bearing sleeve and the bearings at both ends of the bearing sleeve into the fixing element.

The present invention improves the conventional shilly-car by providing the lightweight ergonomic seat cushion, swing tube and U-shaped handlebar to achieve an easy swing and the curved steel tube structure of the connecting tube and the rear-wheel tube to enhance the strength and safety, so that the invention can improve the service life of the product and provide a flexible, safe and easy ride to users.

Compared with the prior art, the present invention has the following advantages:

1. The invention provides an improved hand-swing type shilly-car structure with the handlebar coupled to the swing tube to form a U-shape end which is provided for installing two bearings into a rotating circular tube of the guide wheel swing tube and the connecting tube is coupled to the U-shape swing tube, such that the handlebar can be turned sideway to move the shilly-car forward with a labor saving manner.

2. The D-shaped tube and the D-shaped plastic leg cover on the connecting tube have large area in contact with the leg to achieve the effects of preventing slips, saving power, and providing a safe ride.

3. The connecting tube and the rear-wheel tube are integrally formed and secured with high safety, and no unnecessary assembling process is involved, so as to improve the safety of the shilly-car significantly.

4. The cushion frame includes two sets of fixing holes and complies with the ergonomic design, and the plastic molded seat cushion is secured by fixing screws. The two sets of fixing holes of the cushion frame are provided for adjusting the position of the seat cushion to fit users of different heights, so that no backache is caused even when children rides on the shilly-car for a long time.

5. The whole shilly-car reduces its steel tubes to fit the ride for children of 3~5 years old, so as to overcome the fragile plastic shilly-car that may be cracked or broken easily by collisions. The lightweight shilly-car and the comfortable seat cushion of the present invention allow the shilly-car to move forward easily, and thus the hand-swing type shilly-car of the invention features a simple secured structure, a flexible operation, a long service life, and a safe and comfortable ride.

6. The main frame module comprised of the rear-wheel tube and the main-frame tube is adopted to achieve the effects of saving steel materials, reducing the total weight, providing high security and safety, and lowering the cost.

7. The ergonomic plastic molded cushion safeguards the children's growth and development and provides a comfortable and safe ride.

DESCRIPTION OF THE PREFERRED EMBODIMENTS

The present invention will become clearer in light of the following detailed description of an illustrative embodiment of this invention described in connection with the drawings. It is intended that the embodiments and drawings disclosed herein are to be considered illustrative rather than restrictive.

Figure 1:
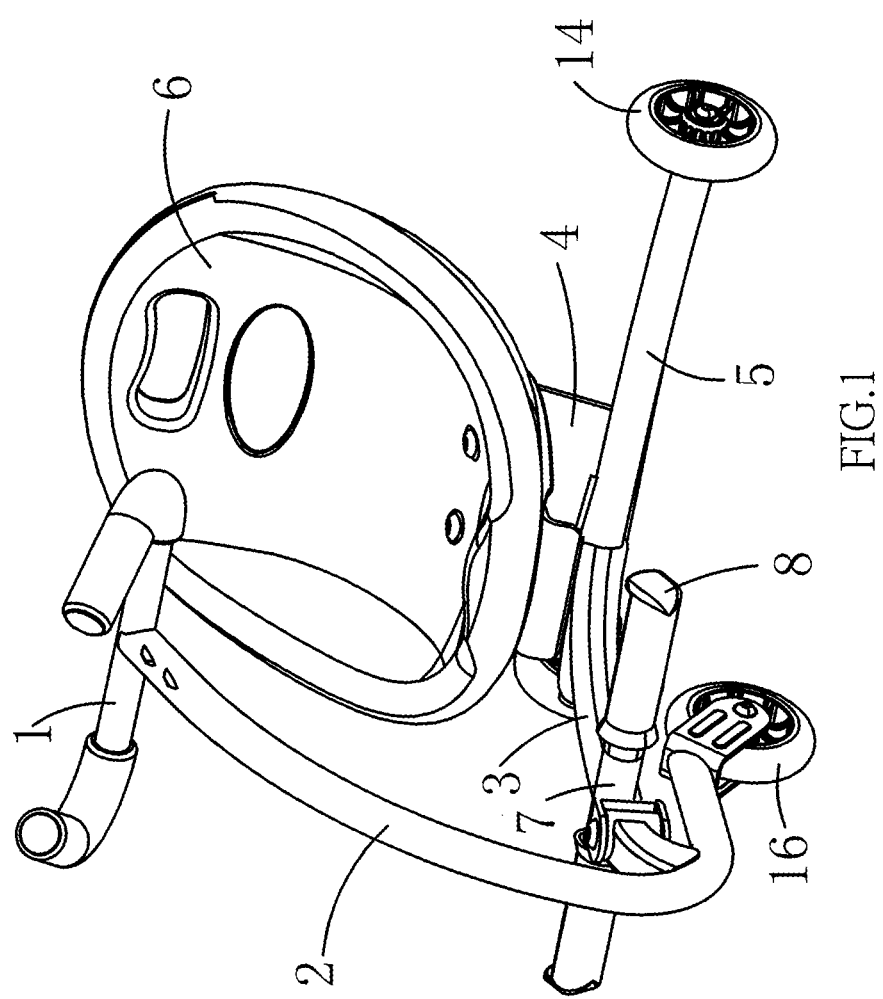
FIG. 1 is a perspective view of a hand-swing type shilly car of the present invention.
Figure 2:
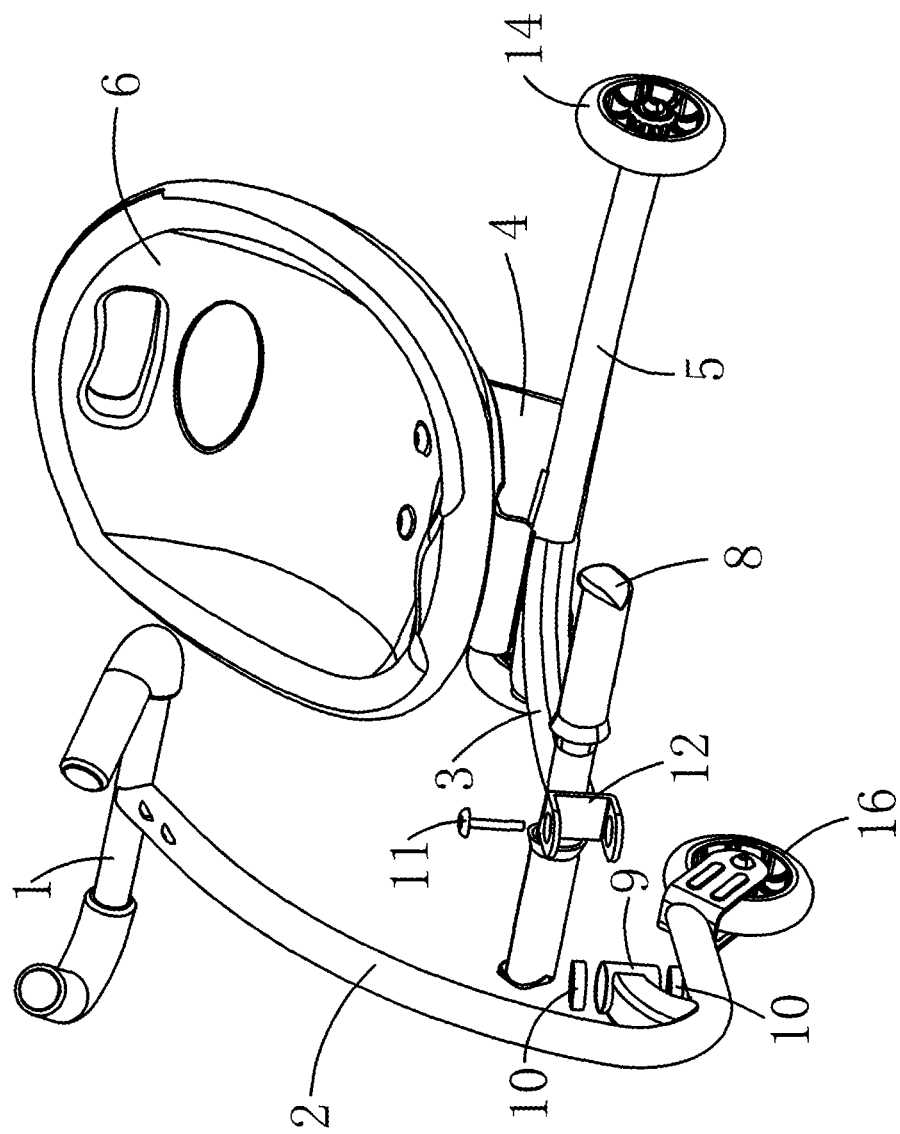
FIG. 2 is an exploded view of a hand-swing type shilly car of the present invention.

With reference to FIGS. 1 and 2 for a hand-swing type shilly-car in accordance with a preferred embodiment of the present invention, the hand-swing type shilly-car comprises a main frame module and a hand-swing module, wherein the main frame module includes a rear-wheel tube 5 having two moving wheels 14 mounted onto both ends of the rear-wheel tube 5 respectively, and an end of the rear-wheel tube 5 is fixed to a main-frame tube 3 at the middle of the rear-wheel tube 5, and the rear-wheel tube 5 is an U-shaped tube, and a cushion 6 is installed on the rear-wheel tube 5 and the main-frame tube 3, and a cushion frame 4 is installed between the rear-wheel tube 5 and the main-frame tube and has at least one fixing hole for installing the cushion 6, and a pedal tube 7 is a D-shaped tube installed on and welded to both left and right sides of the front end of the main-frame tube 3 separately, and a plastic leg cover 8 is covered onto the exterior of the pedal tube 7 and provided for users to put both legs thereon, so as to increase the contact surface and prevent slips.

The hand-swing module includes a swing tube 2, a handlebar 1 which is an U-shaped tube installed at the top of the swing tube 2, a guide wheel 16 installed at the bottom of the swing tube 2, a bearing sleeve 9 disposed at the swing tube 2 and opposite to the top of the guide wheel 16 and welded to the swing tube 2, and a bearing 10 built into the top and bottom of the bearing sleeve 9 separately. A fixing element 12 of a C-shaped structure is installed at an end of the main-frame tube 3, and the bearing sleeve 9 is passed through the built-in bearings 10, secured from top to bottom through a fixing shaft 11, and rotably fixed into a groove of the fixing element 12.

Figure 3:
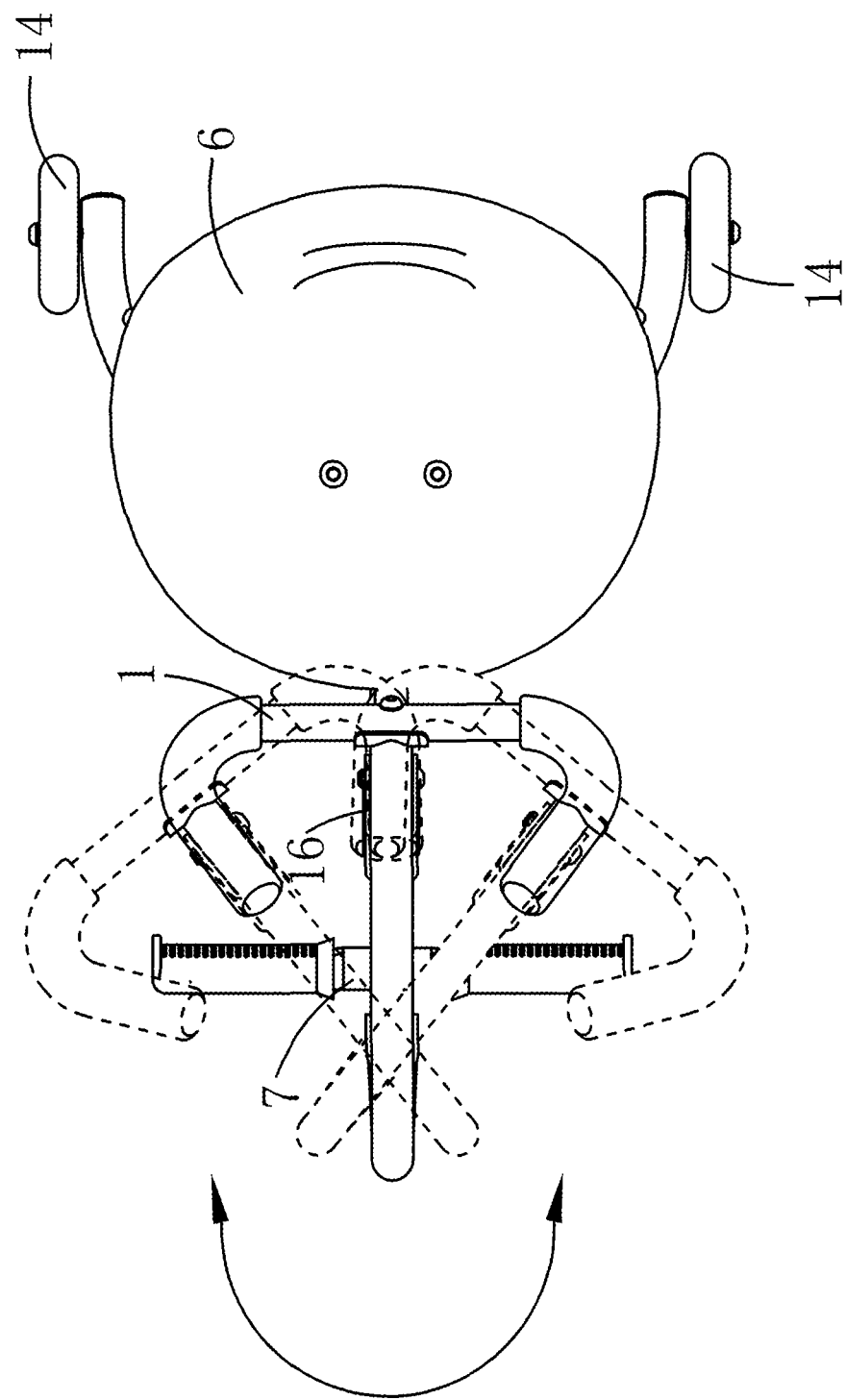
FIG. 3 is a schematic view of an application of a hand-swing type shilly car of the present invention.

During use, the guide wheel 16 and the left and right moving wheels 14 are configured in a triangular shape. With reference to FIG. 3, the hand-swing type shilly-car is securely and stably supported, so that a user can sit on the cushion 6 of the hand-swing type shilly-car safely, and the user can place both legs on the pedal tube 7 and hold the handlebar 1 by both hands, and then the user can apply forces sideway to the handlebar 1 and the pedal tube 7 through both hands and both legs, so that the guide wheel 16 disposed at the rear of the bottom end of the swing tube 2 can be driven to swing sideway to move the shilly-car forward in a S-shaped path. In the meantime, the left and right moving wheels 14 are supported and rotated to allow the whole shilly-car to move and slide forward smoothly.

Figure 4:
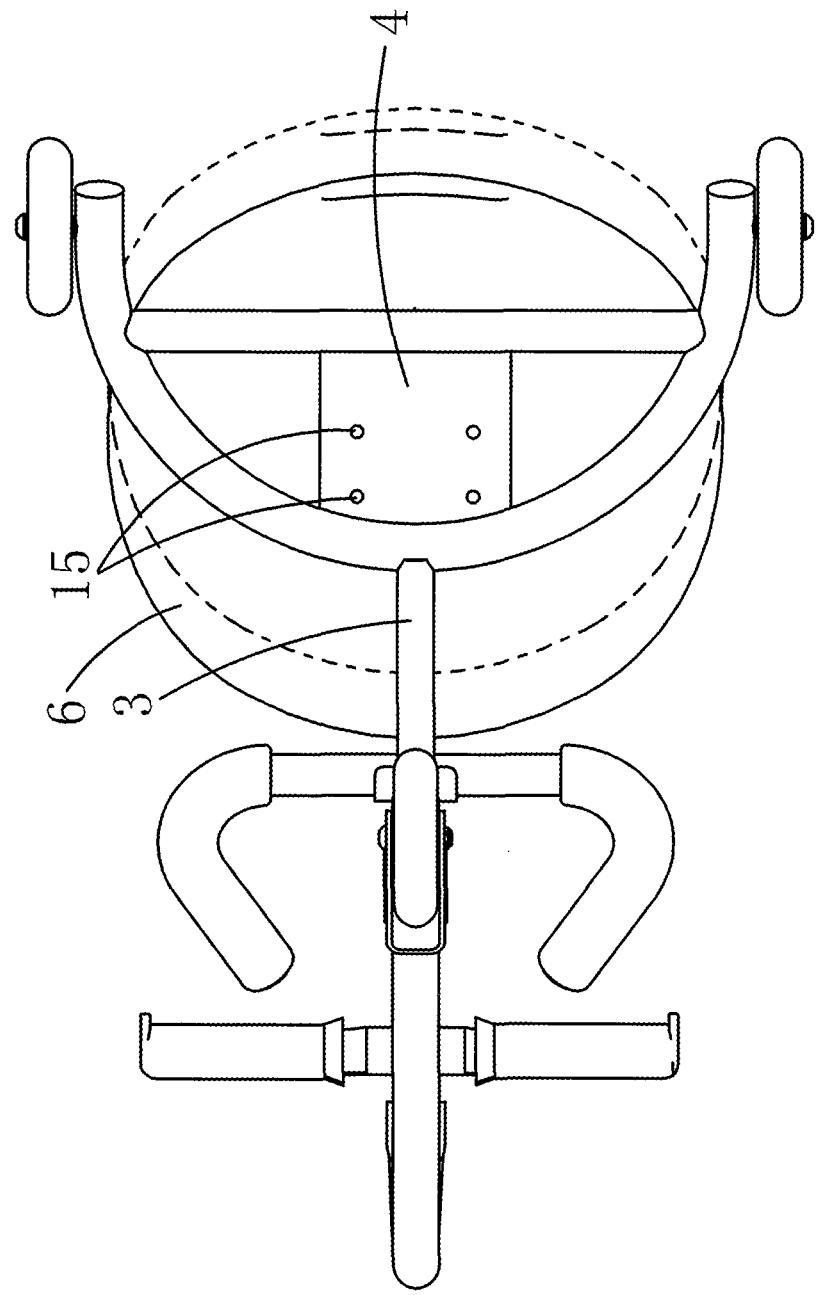
FIG. 4 is a schematic view of a hand-swing type shilly car of the present invention.

In FIG. 4, a cushion frame 4 having two sets of fixing holes 15 is installed between the rear-wheel tube 5 and the main-frame tube 3, and the ergonomic plastic molded seat cushion 6 is secured by fixing screws, and the two sets of fixing holes 15 of the cushion frame 4 are provided for adjusting the position of the seat cushion 6 to fit users of different heights. The cushion frame 4 and the main-frame tube 3 are integrally formed to achieve the effect of a lightweight ergonomic seat cushion, and the swing tube and the handlebar constitute a U-tube structure for providing a labor-saving effect for the light and quick swings. The curved tube structure of the connecting tube and the rear-wheel tube comes with high strength and safety. In addition, the main frame module comprised of the rear-wheel tube and the main-frame tube can achieve the effects of saving steel materials, reducing the total weight, providing high security and safety, and lowering the cost. Further, the ergonomic plastic molded cushion can guarantees the children's growth and development and provides a comfortable and safe ride.

In summation of the above description, the present invention herein enhances the performance than the conventional structure and further complies with the patent application requirements, and is thus duly filed for patent application. While the invention has been described by means of specific embodiments, numerous modifications and variations could be made thereto by those skilled in the art without departing from the scope and spirit of the invention set forth in the claims.

What is claimed is:

1. A hand-swing type shilly-car, comprising:
   a main frame module, having a rear-wheel tube, a main-frame tube having an end fixed to the middle of the rear-wheel tube, the rear-wheel tube being a U-shaped tube forming an opening toward the rear-end of the shilly-car and welded to the main frame module, a T-shaped structure formed by the rear-wheel tube and the main-frame tube and installed with a cushion, and two moving wheels installed at both ends of the rear-wheel tube respectively, and a pedal tube installed on both left and right sides of a front end of the main-frame tube respectively; and
   a hand-swing module, having a swing tube, a handlebar installed at the top of the swing tube, a guide wheel installed at the bottom of the swing tube, a bearing sleeve disposed above the guide wheel, and bearings installed separately at the top and bottom inside the bearing sleeve;
   wherein the handlebar is a U-shaped tube forming an opening toward the front-end of the shilly-car;
   wherein the pedal tube of the main-frame tube is a fixing element with a C-shaped structure for containing the bearing sleeve and the bearings at both ends of the bearing sleeve, and the shilly-car further comprises a fixing shaft for rotably fixing the bearing sleeve and the bearings at both ends of the bearing sleeve into the fixing element.

2. The hand-swing type shilly-car of claim 1, further comprising a cushion frame disposed between the rear-wheel tube and the main-frame tube, and the cushion frame having at least one fixing hole for installing a cushion and allowing a user to adjust the front and rear positions of the cushion.

3. The hand-swing type shilly-car of claim 1, wherein the pedal tube is a welded to both left and right sides of a front end of the main-frame tube.

4. The hand-swing type shilly-car of claim 3, wherein the pedal tube is covered by a plastic leg cover, and the plastic leg cover is provided for the user to put both legs thereon, so that the contact surface is increased to prevent slips.

5. The hand-swing type shilly-car of claim 1, wherein the rear-wheel tube has a U-shape which is substantially continuously curved from end-to-end.

* * * * *